Figure 1:
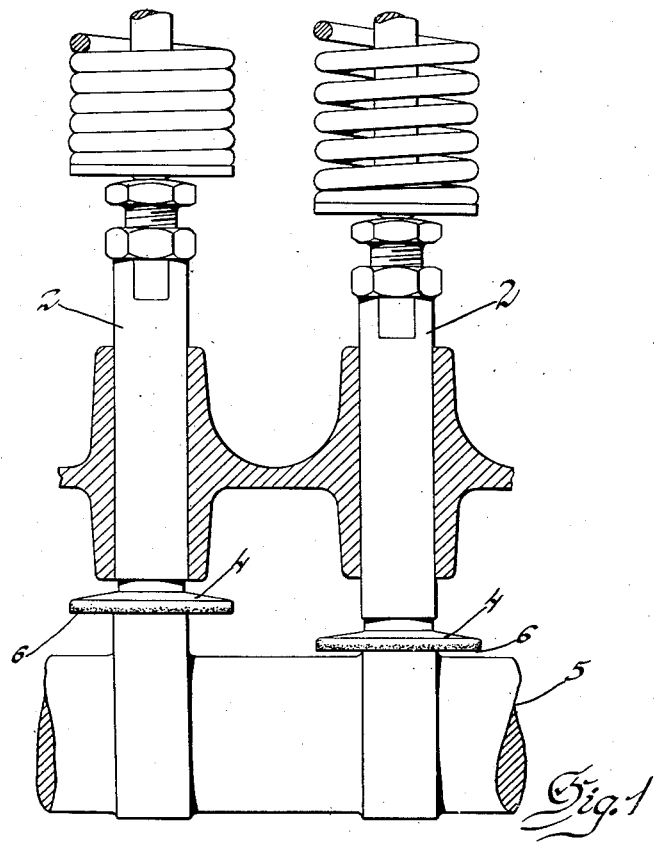

Dec. 7, 1926.

H. FRASER 1,609,706

VALVE TAPPET

Filed June 6, 1923

Inventor

Harry Fraser

By Blackmore, Spencer & Flint
Attorney

Patented Dec. 7, 1926.

1,609,706

UNITED STATES PATENT OFFICE.

HARRY FRASER, OF PONTIAC, MICHIGAN, ASSIGNOR TO GENERAL MOTORS CORPORATION, OF DETROIT, MICHIGAN, A CORPORATION OF DELAWARE.

VALVE TAPPET.

Application filed June 6, 1925. Serial No. 35,427.

It is an object of this invention to provide parts which are subjected to hard rubbing action and impact, or impact alone, with a protective covering which will prevent excessive wear. This covering or coating is composed of a relatively soft metal which, when subjected to continued rubbing and pounding, is forced into intimate contact with the harder metal of which the part is composed, providing the latter with a very smooth polished surface which successfully resists wear.

I have applied this idea to mushroom tappets of automobile engines and have preferred to apply the protective coating to the portion of the tappet which engages the shaft and is subjected to a combined rubbing and pounding action. However, it is obvious that my invention is not limited to this specific application.

Figure 2:
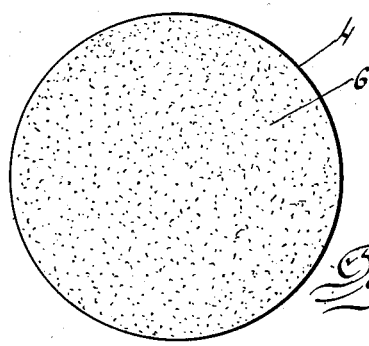

Referring now to the drawings:

Figure 1 shows a side elevation of a couple of valve tappets operatively assembled with the cam shaft; and Figure 2 is a plan view of the cam engaging portion of the tappet.

The drawing shows a mushroom valve tappet 2 of conventional design. The portion 4 of the tappet which engages the cam shaft 5 is provided with a protective covering or coating 6 of relatively soft metal such as tin, babbitt, copper, or lead. In practice I have found it desirable to apply first a coating of tin and then a coating of Babbitt alloy. However, my invention is not limited in its scope to use with this particular part nor to the use of these specific metals or combinations of metals. The gist of the invention is broadly the provision of a coating of a relatively soft metal which, upon being subjected to continued impact and hard rubbing action will be worked into the face of the harder metal of which the part is composed, forming a smooth polished surface which will successfully resist wear and prevent scoring or cutting of the engaging parts.

What I claim and desire to secure by Letters Patent is:

1. An impact receiving member having a portion thereof which is subjected to impact covered with a thin coating of a relatively soft metal.

2. An impact receiving member having a portion thereof which is subjected to impact thinly coated with tin and Babbitt alloy.

3. A valve tappet having the cam shaft engaging portion thinly coated with a relatively soft metal.

4. A valve tappet having the cam shaft engaging portion thinly coated with a soft metallic substance containing tin.

5. A valve tappet having the cam shaft engaging portion thinly coated with a soft metallic substance containing babbitt.

6. A valve tappet having the cam shaft engaging portion thinly coated with tin and a Babbitt alloy.

7. A tappet having a head formed with a ground bearing face adapted for engagement with a cam, said bearing face having a metallic, anti-friction surface protecting material thereon and united therewith.

In testimony whereof I affix my signature.

HARRY FRASER.